United States Patent [19]

Krishnakumar et al.

[11] Patent Number: 5,279,433
[45] Date of Patent: Jan. 18, 1994

[54] PANEL DESIGN FOR A HOT-FILLABLE CONTAINER

[75] Inventors: Suppayan M. Krishnakumar, Nashua; Wayne N. Collette, Merrimack; David P. Piccioli, Auburn, all of N.H.

[73] Assignee: Continental Pet Technologies, Inc., Florence, Ky.

[21] Appl. No.: 962,243

[22] Filed: Oct. 16, 1992

Related U.S. Application Data

[62] Division of Ser. No. 842,228, Feb. 26, 1992, Pat. No. 5,178,289.

[51] Int. Cl.⁵ .............................................. B65D 23/00
[52] U.S. Cl. .................................... 215/1 C; 220/669; 220/675
[58] Field of Search ............. 215/1; 220/669, 673, 220/674, 675

[56] References Cited

U.S. PATENT DOCUMENTS

| | | | |
|---|---|---|---|
| 3,335,902 | 8/1967 | Javorik | 220/673 |
| 4,387,816 | 6/1983 | Weckman | 215/1 C |
| 4,512,490 | 4/1985 | Frei et al. | 220/673 |
| 4,805,788 | 2/1989 | Akiho | 215/1 C |
| 4,818,575 | 4/1989 | Hirata et al. | 215/1 C X |
| 4,863,046 | 9/1989 | Collette et al. | 215/1 C |
| 4,946,053 | 8/1990 | Conrad | 215/1 C |
| 4,949,861 | 8/1990 | Cochran | 215/1 C |
| 4,993,565 | 2/1991 | Ota et al. | 215/1 C |
| 5,010,013 | 4/1991 | Serkes et al. | 215/1 C X |
| 5,064,081 | 11/1991 | Hayashi et al. | 215/1 C |

*Primary Examiner*—Allan N. Shoap
*Assistant Examiner*—Vanessa Caretto
*Attorney, Agent, or Firm*—Wolf, Greenfield & Sacks

[57] ABSTRACT

A vacuum panel design for a hot-fill container which resists the increase in container diameter (barreling) which may occur during hot-filling and/or when the container is dropped on a hard surface. In one embodiment, adapted for a full wrap (360°) label, a plurality of vacuum panels are symmetrically disposed about a vertical centerline of the container and horizontal stiffening ribs are provided across select portions of the panel, namely, across the vacuum panel recesses and across the post and panel ribs. In another embodiment, adapted for spot labeling, a pair of vacuum panel regions are symmetrically disposed about a vertical plane passing through the vertical centerline of the container, which regions form spot label areas and are joined by connecting end segments. The angular extent of the spot label areas and end segments may be varied to adjust the resistance to barreling and/or to provide a squeezable container, and horizontal stiffening ribs may further be provided to decrease barreling.

8 Claims, 12 Drawing Sheets

PANEL DESIGN FOR A HOT-FILLABLE CONTAINER

This application is a division, of application Ser. No. 07/842,228, filed Feb 26, 1992 now U.S. Pat. No. 5,178,289.

BACKGROUND OF THE INVENTION

The present invention relates to vacuum panel containers, and more particularly to a vacuum panel design for a hot-fill container adapted to resist the increase in container diameter (barreling) which may occur during hot filling and/or when the container is dropped on a hard surface.

A container, such as a biaxially-oriented polyethylene terephthalate (PET) beverage bottle, may be adapted to receive a hot-fill product with a minimum of thermal shrinkage and distortion. Such a bottle is described in U.S. Pat. No. 4,863,046 entitled "Hot Fill Container," which issued Sep. 5, 1989 to Collette et al. The Collette et al. container is provided with a plurality of recessed vacuum panels in the middle panel section of the container, which reduce the magnitude of the vacuum generated in the filled and capped container and prevent any large uncontrolled shape distortion of the container as it contracts during product cooling. Thus, when the container is subjected to internal negative pressure as the product cools, the vacuum panels (all of them) deform and move inwardly in unison. A wrap-around label covers the vacuum panels and is supported by raised wall portions in the vacuum panels, post areas between the vacuum panels, and horizontal glue lands above and below the vacuum panels. Vertical recessed ribs may be provided in the post and raised wall areas to increase the longitudinal stiffness of the panel section.

The design of the vacuum panels may vary; two other designs are illustrated in: 1) U.S. Design Pat. No. 315,869 entitled "Container Body For Liquids Or The Like," which issued Apr. 2, 1991 to Collette; and 2) copending and commonly-owned U.S. Ser. No. 07/792,449 entitled "Modular Mold," which was filed Nov. 15, 1991 by Collette et al., each of which is hereby incorporated by reference in its entirety.

Hot-fill containers are adapted for the packaging of liquids which must be placed in the container while hot to provide for adequate sterilization. During filling, the container is subjected to elevated temperatures on the order of 180°-185° F. (the product temperature) and positive internal pressures on the order of 2-5 psi (the filling line pressure). This tends to "barrel," i.e., increase the diameter of, the label panel portion of the container. Containers with excessive barreling during filling cause improper cap and label applications, and improper or inadequate vacuum panel movement (i.e., less than optimum performance under vacuum).

Also, when a filled and labeled container is dropped on a hard floor, a hydraulic hammer effect from the product causes the label panel to barrel out. Excessive barreling from even a moderate drop impact may produce a torn label, even when the container is held in a corrugated box. A bottle with excessive barreling and/or a torn label is generally unsaleable and will remain on the store shelf.

It is an object of the present invention to provide an improved vacuum panel design for a container which solves the foregoing problems of barreling. It is a further object to provide vacuum panel designs adapted for full wrap-around labels or for spot labels and which also resist barreling.

SUMMARY OF THE INVENTION

The container of this invention provides increased resistance to barreling by modifying select portions of the panel section to increase the hoop (diameter) stiffness and reduce the hoop stretchability of the container.

More specifically, it has been found that certain areas of the panel region undergo relatively greater amounts of dimensional change, and these areas are modified to reduce the amount of change.

In a first embodiment, a container is provided having a plurality of vacuum panels symmetrically disposed about a vertical centerline of the container. This container is adapted for full wrap (360°) label applications. The vacuum panels are vertically elongated recesses separated by post areas and portions of the recesses are modified to provide horizontal stiffening portions or ribs across the vacuum panel. Additional horizontal stiffening portions may be provided across the vertically recessed post and/or panel ribs to further decrease the hoop stretchability. The dimensions and placement of the horizontal stiffening portions should be adapted to the specific panel height of the container. They preferably are disposed at the vertical center plane of the panel section for a shorter panel section, e.g., 100 mm or below, as commonly found in bottle volumes of 2 liter or below. At least two equally-spaced stiffening portions above and below the center plane are preferred for a taller panel section, e.g., 100 mm or above, as commonly found in bottle volumes above 2 liters, in order to break-up the vertical expanse of the taller panel section.

In a second embodiment of this invention, an improved vacuum-panel container is provided having a pair of symmetrically disposed spot label areas provided on either side of a vertical center plane which passes through the vertical center line. The spot label panels are joined by a pair of full-diameter connecting end segments. Each spot label area has at least one vacuum panel which is covered by the spot label, the label being attached at its edges to the post areas of the panel. The spot label areas are recessed to protect the label from being torn or detached. The angular extent of the connecting segments may be increased to reduce the barreling effect of the panel region and if desired, horizontal stiffening ribs such as those described in the first embodiment may also be added to reduce barreling. Furthermore, the relative angular extents of the connecting segments and panel sections may be adapted to provide a squeezable beverage bottle, such as that used by bicycle riders wherein a beverage is dispensed out the top end simply by squeezing the bottle between the fingers.

Further details of the invention will be more specifically described by the following description and drawings of certain preferred embodiments.

DETAILED DESCRIPTION

Figure 1:
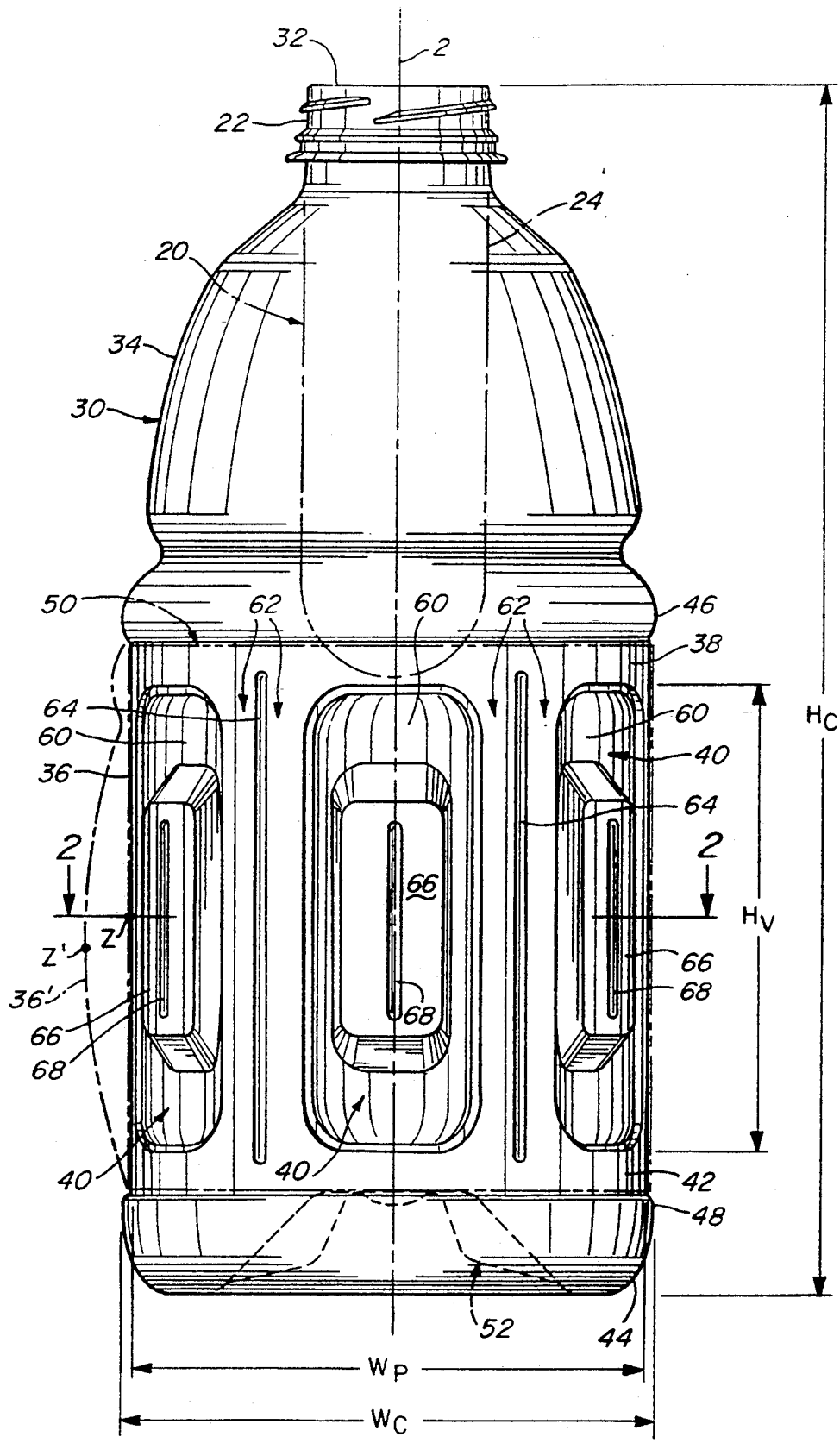
FIG. 1 is a front elevational view of a prior art hot-fill container having six vacuum panels symmetrically disposed about a vertical centerline.
Figure 2:
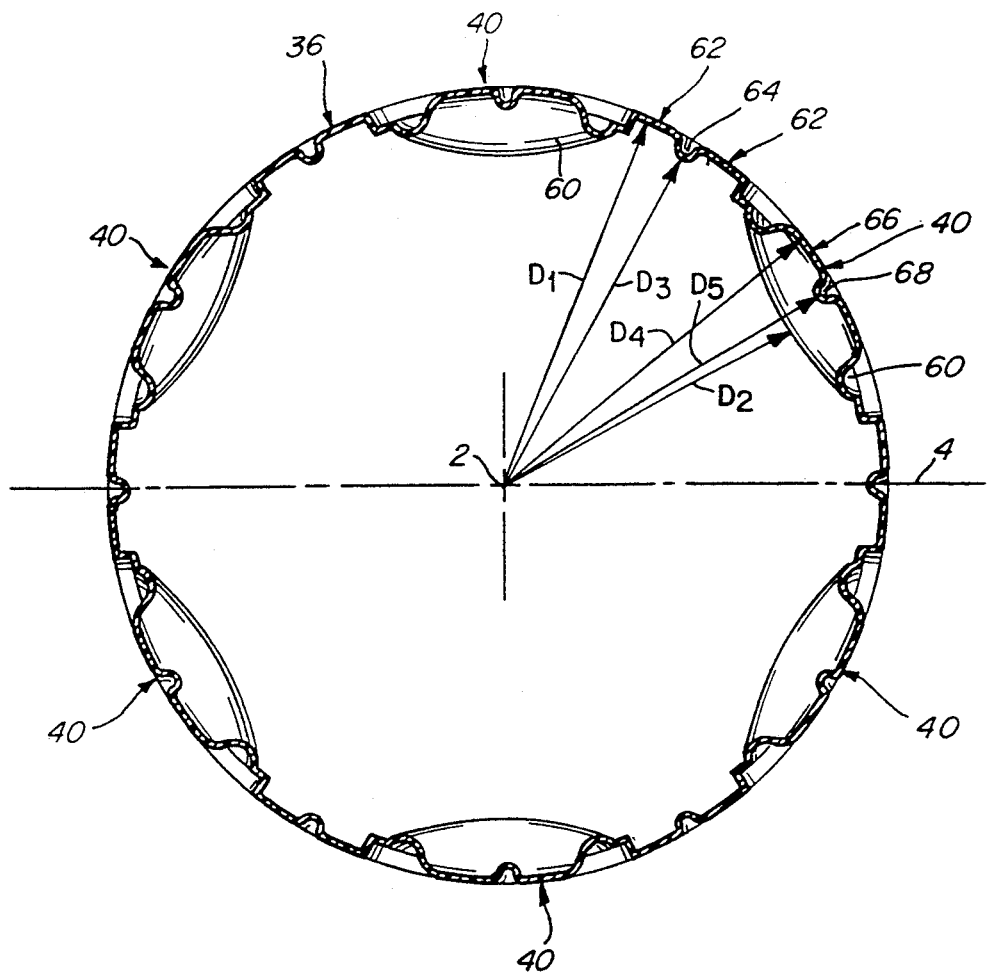
FIG. 2 is a cross sectional view of the container of FIG. 1 taken along section lines 2—2, showing the cross section of the six vacuum panels separated by post areas having vertical reinforcing post ribs.
Figure 3:
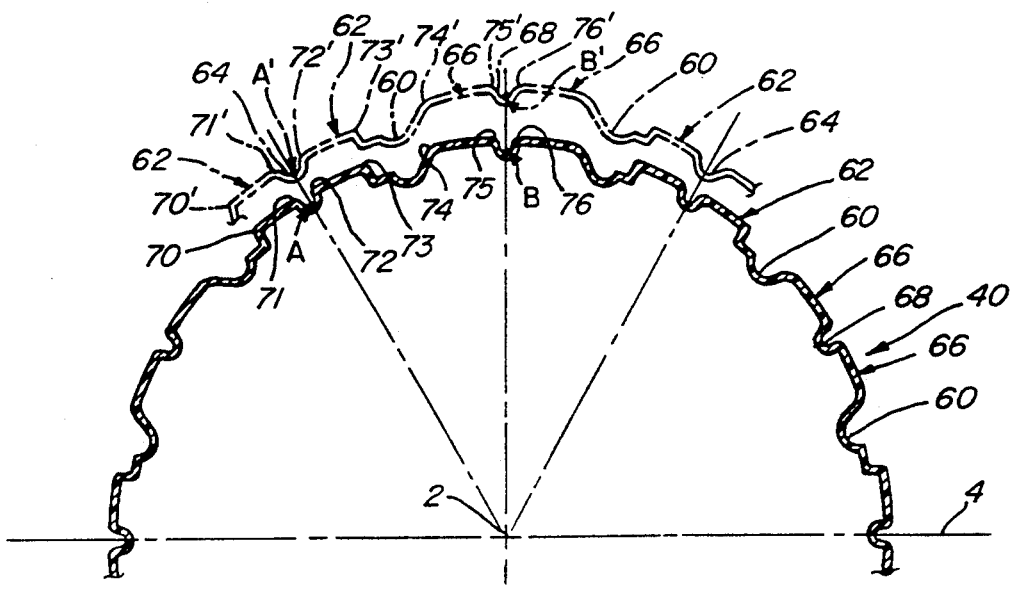
FIG. 3 is a partial cross sectional view similar to FIG. 2 showing a portion of the container wall before and after barreling, and illustrating the points between which the greatest expansion occurs.

FIGS. 1-3 show a prior art hot-fill container and illustrate the problem of barreling.

FIG. 1 is a front view of a 64-ounce, hot-fill PET (polyethylene terephthalate) beverage bottle of the type described in U.S. Pat. No. 4,863,046 entitled "Hot Fill Container", issued Sep. 5, 1989 to Collette et al. and which is hereby incorporated by reference in its entirety. The bottle 30 is blow molded from an injection molded preform 20 (shown in dotted lines) having an upper thread finish 22 and a lower tube portion 24. During blowing, the preform assumes the shape of the interior molding surface (not shown) to form a biaxially-oriented bottle. The thread finish 22 is not blown and becomes the thread finish of the bottle having an open mouth 32 which receives a screw on cap (not shown). The lower tube portion 24 is blown to form: (a) a tapered upper shoulder portion 34; (b) a middle cylindrical panel portion 36 over which a full wrap label 50 is applied, said panel portion including an upper glue land 38, vacuum panels 40, and a lower glue land 42; and (c) a base 44. The upper shoulder 34 flares radially outwardly from the relatively narrow diameter neck of the thread finish 22 to the panel section 36, and includes a bumper 46 of greater diameter than the label panel 36 in order to protect the attached label 50 during shipment and storage. The base 44 also includes an enlarged diameter bumper 48 to protect the label and a recessed closed bottom end 52. The vacuum panels 40 may take different forms, but generally include a plurality of vertically-elongated recesses and reinforcing ribs. The upper and lower glue lands 38, 42 are cylindrical areas, which, along with portions of the vacuum panels, form the areas on which the label 50 rests.

The substantially cylindrical vacuum panel region, which is shown in horizontal cross-section in FIG. 2, includes six recessed vacuum panels 40 symmetrically disposed about a vertical centerline 2. The panels 40 are also symmetrical about a vertical plane 4 passing through the centerline 2. Each vacuum panel 40 is disposed between a post wall 62, which constitutes part of the outermost cylindrical panel wall disposed at a first horizontal distance $D_1$ from the vertical centerline 2. Each vacuum panel 40 includes a vertically-disposed rectangular recess 60 having rounded corners and which forms an arc or other inwardly concave shape in horizontal cross-section (see FIG. 2), the recess being disposed at a second distance $D_2$ from the vertical centerline 2 which is less than the first distance $D_1$ of post wall 62. A vertically-elongated and recessed post rib 64 is provided in the post wall 62 midway between each vacuum panel 40, to provide longitudinal stiffness, and is disposed at a third distance $D_3$ from the vertical centerline 2 which is less than the first distance $D_1$ of the post wall 62. Each vacuum panel 40 further includes a vertically-elongated and rectangular raised wall 66 in the middle of recess 60, which is disposed at a fourth distance $D_4$ from centerline 2 which is greater than the second distance $D_2$ of recess 60, and in this example is the same as the first distance $D_1$ of post wall 62. Finally, a vertically-elongated and recessed panel rib 68 is provided down the center of raised wall 66 to provide further longitudinal stiffness, said panel rib 68 having disposed at a fifth distance $D_5$ from centerline 2, which is less than the first distance $D_1$ of the post wall 62 and raised wall 66. The post and panel ribs 64, 68 are relatively small-diameter arcs with rounded edges for a smooth transition into the adjoining wall, while the vacuum panel recess 60 is a generally deeper and broader concave portion, with each recess occupying an angular extent of about 40° of the total circumference of 360°. This 64-ounce bottle has a height $H_c$ of about 270 mm, a vacuum panel height $H_v$ of about 100 mm, and a width $W_c$ of about 110 mm.

As shown in dashed lines in FIG. 1, when barreling occurs the panel section increases in diameter. The panel wall 36 moves outwardly to 36', and a point Z at the midsection of the panel wall moves outwardly and downwardly to Z'.

It has further been found, as illustrated in FIG. 3, that the increase in diameter occurs most significantly between certain points on the panel wall. Because of symmetry the displacement of the circumferential points A and B due to barreling is along the radial direction, and the increase in container diameter is proportional to the increase in distance between A and B. The points 70', 71', 72', 73', 74', 75' and 76' on panel wall 36 correspond to the points 70, 71, 72, 73, 74, 75 and 76 before deformation. However, the increase in the distance between each of points 71-72 (across recessed post rib 64), 73-74 (across vacuum panel recess 60), and 75-76 (across recessed panel rib 68) is much more than that between points 72-73 (across the full-width post wall 62) and 74-75 (across the full-width raised wall 66), and thus the former contribute to the majority of the increase in the distance between A and B.

The magnitude of barreling, and the resulting increase in the midpanel diameter, can be reduced by reducing the hoop stretchability (i.e., radial expansion) of the panel cross section. FIGS. 4-9 show panel designs with different degrees of reduced hoop stretchability by the addition of horizontal stiffening portions or ribs across one or more of points 71-72, 73-74 and 75-76.

Figures 4, 4A:
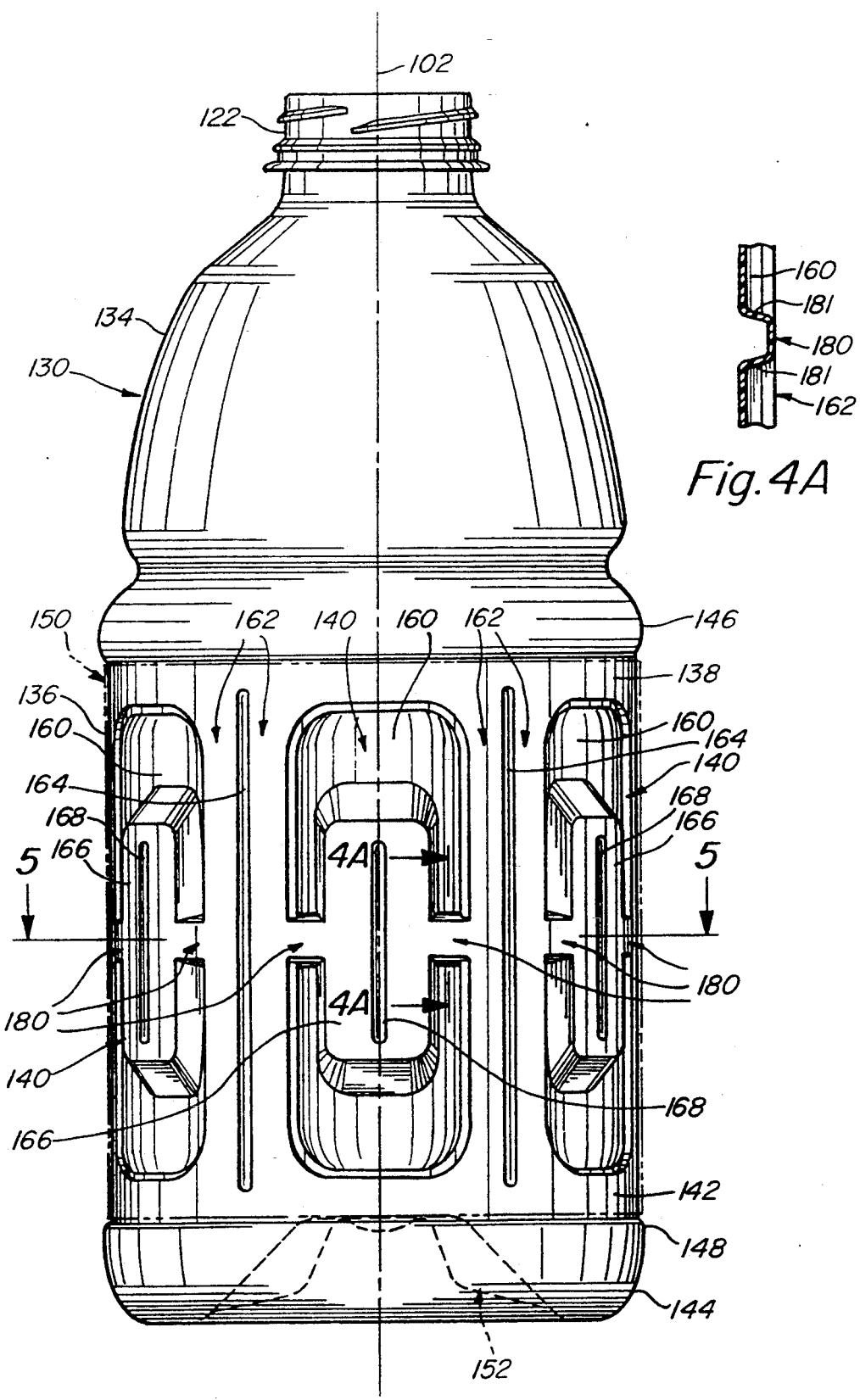
FIG. 4 is a front elevational view of a first embodiment of the hot-fill container of this invention having six symmetrically disposed vacuum panels with horizontal stiffening portions.
FIG. 4A is a partial cross sectional view taken along section lines 4A—4A of FIG. 4, showing the vertical cross section of one of the recessed vacuum panels and a horizontal stiffening portion.
Figure 5:
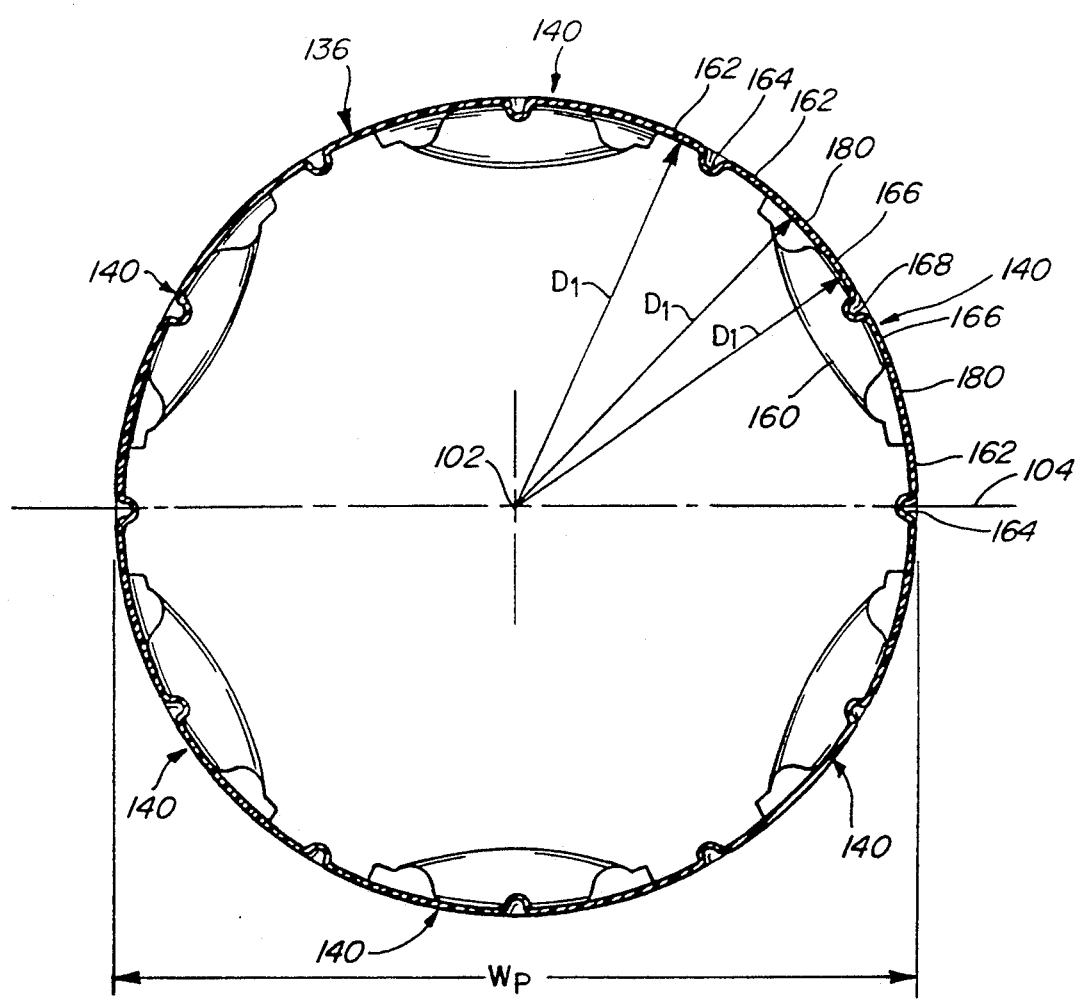
FIG. 5 is a cross sectional view of the container of FIG. 4 taken along section lines 5—5, showing the horizontal cross section of the six vacuum panels with the stiffening portions across the recesses in the vacuum panels.

FIGS. 4-5 show front and cross sectional views of a bottle 130 which is similar in many regards to bottle 30 of FIG. 1, and wherein corresponding elements have been numbered by simply adding "100" to the corresponding figure number from FIG. 1. However, the bottle 130 of FIGS. 4-5 further includes horizontal stiffening portions or ribs 180 across vacuum panel recess 160 at the mid-vertical cross sectional plane (corresponding to section line 5—5). Thus, with reference to FIG. 3, the recess between points 73-74 has been eliminated at the mid panel section of the bottle. FIG. 4A shows the panel recess 160 above and below the horizontal stiffening rib 180, said rib 180 having a pair of substantially horizontal sidewalls 181 and an end wall 162 coextensive with the post wall 162. Thus, rib 180 is disposed at the full panel width $W_p$ (FIG. 5) and lies at the same distance $D_1$ from vertical centerline 102 as post wall 162 and raised wall 166. Elimination of portions of the recess 160 thus substantially decreases the hoop stretchability of the container.

Figure 6:
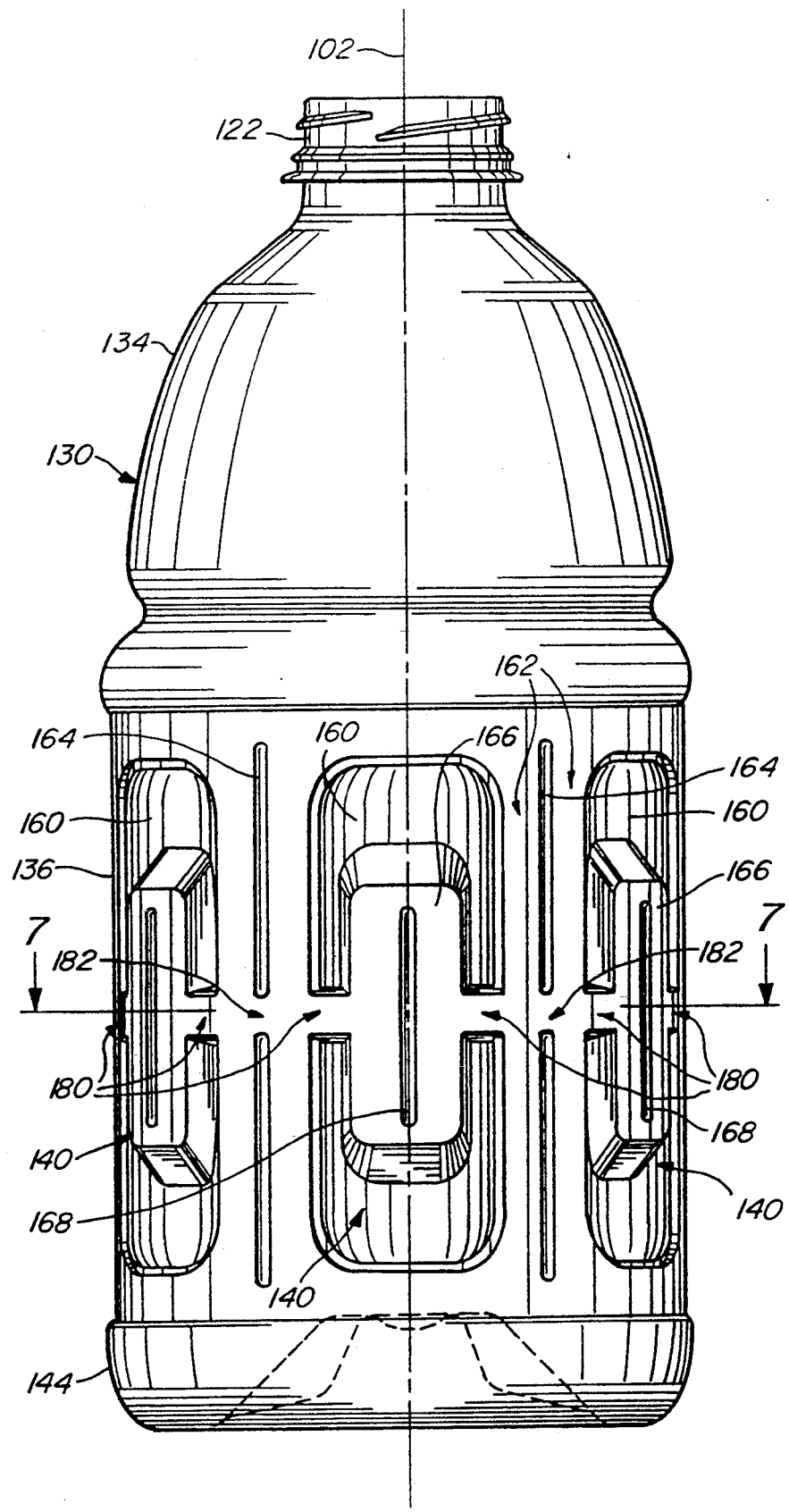
FIG. 6 is a front elevational view of a modified first embodiment of the container of FIG. 4 with additional horizontal stiffening ribs across the post ribs.
Figure 7:
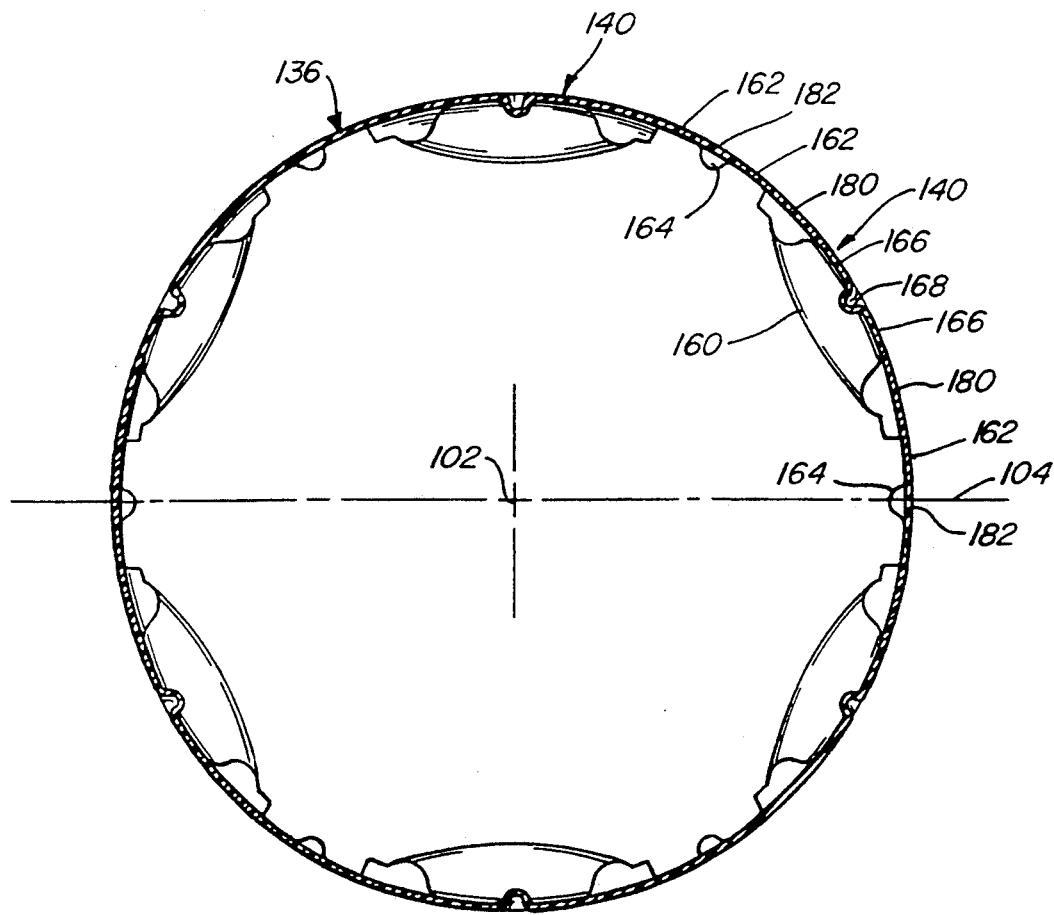
FIG. 7 is a cross sectional view of the container of FIG. 6 taken along section lines 7—7, showing the additional stiffening ribs.

FIGS. 6-7 show front and cross sectional views of the same bottle 130, but including additional horizontal stiffening ribs 182 at the mid-vertical cross sectional plane (corresponding to section line 7—7), wherein the mid-portion of the post rib 164 (points 71-72) is eliminated. Horizontal stiffening ribs 182 are disposed at the same distance $D_1$ from vertical centerline 102 as post wall 162 and raised wall 166, and further decrease the hoop stretchability (along with stiffening ribs 180).

Figure 8:
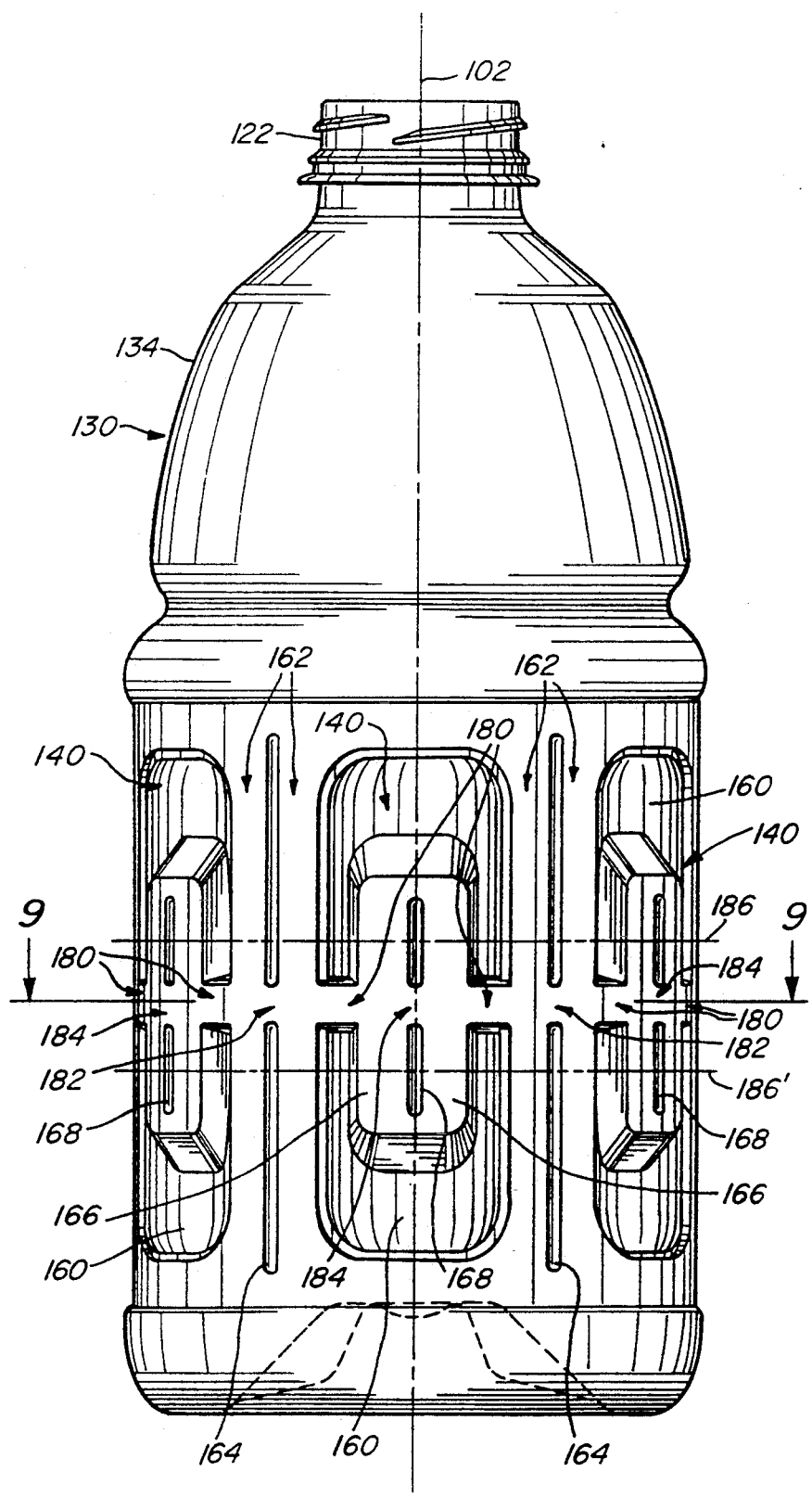
FIG. 8 is a front elevational view of a further modified first embodiment of the container of FIG. 4 with additional horizontal stiffening ribs across the panel and post ribs.
Figure 9:
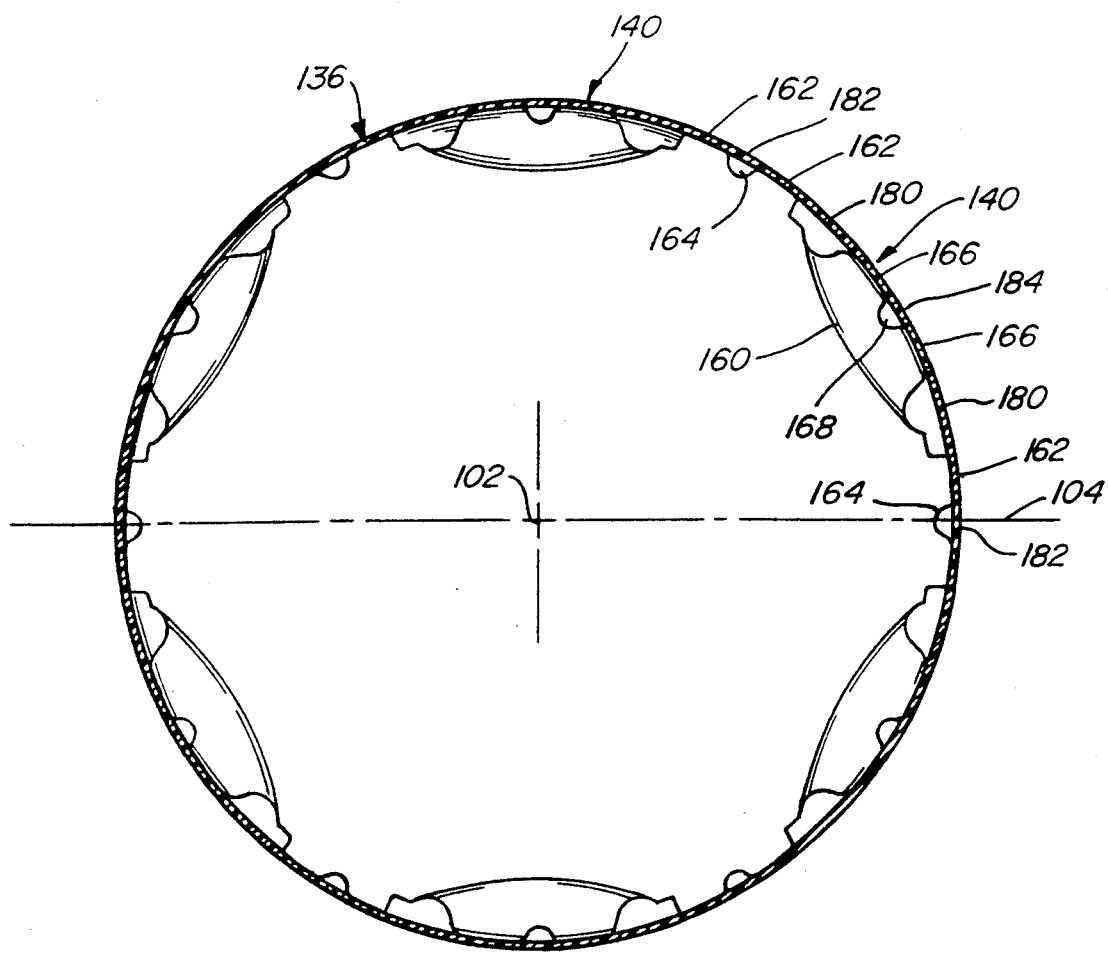
FIG. 9 is a cross sectional view of the container of FIG. 8 taken along section lines 9—9, showing the additional stiffening ribs.

FIGS. 8-9 show front and cross sectional views of the same bottle 130, but including further additional horizontal stiffening ribs 184 at the mid-vertical cross sectional plane (corresponding to cross section line 9—9). wherein the mid-portion of the panel rib 168 (points 75-76) is eliminated. Horizontal stiffening ribs 184 are the same distance $D_1$ from vertical centerline 102 as post wall 162 and raised wall 166, and further decrease the hoop stretchability (along with stiffening ribs 180 and 182).

While FIGS. 4-9 show the horizontal stiffening ribs 180, 182 and 184 at the vertical mid-section of the panel wall 136, it may be desired for relatively larger panel heights (e.g., 100 mm and above) to provide alternatively positioned or additional stiffening ribs. For example, a pair of horizontal stiffening ribs may be provided at dashed lines 186 and 186' above and below the section lines 9—9 in FIG. 8. By thus breaking up the vertical panel length along which barreling may occur, the hoop stretchability is significantly decreased.

Another aspect of the invention is to provide a spot label panel design which preferably has a reduced barreling capability, as illustrated by two further embodiments in FIGS. 10-11 and FIGS. 12-14, respectively. The reduced barreling is achieved by providing enlarged connecting segments at both ends of the bottle which are of the full panel diameter, and/or providing horizontal stiffening ribs similar to those described in the previous embodiments.

Figure 10:
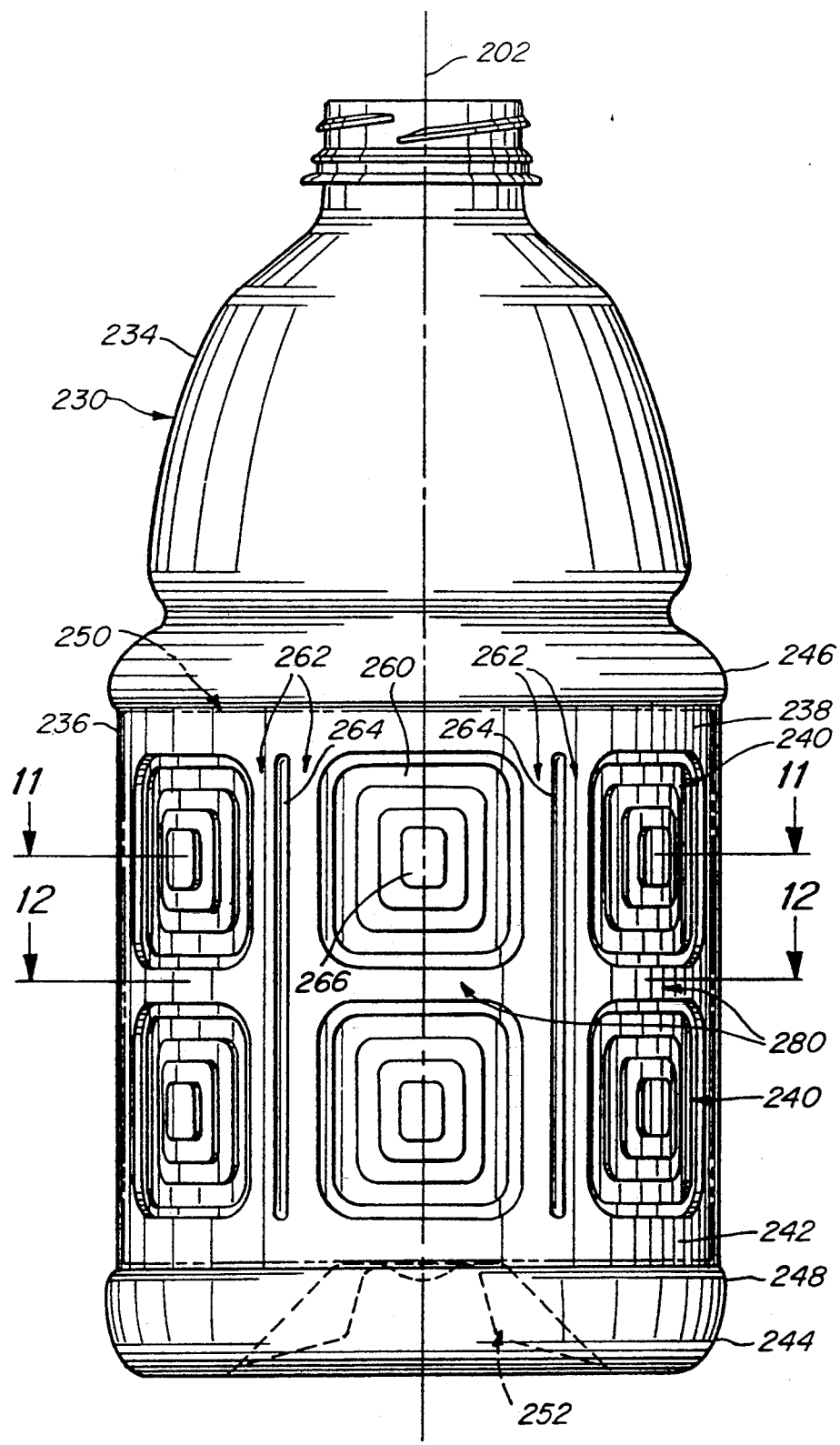
FIG. 10 is a front elevational view of a second embodiment of the hot-fill container of this invention adapted for spot labeling, having two panel sections symmetrically disposed about a vertical plane passing through a vertical centerline of the container, with connecting end segments therebetween, and vertically disposed pairs of vacuum panels above and below a horizontal stiffening portion.
Figure 11:
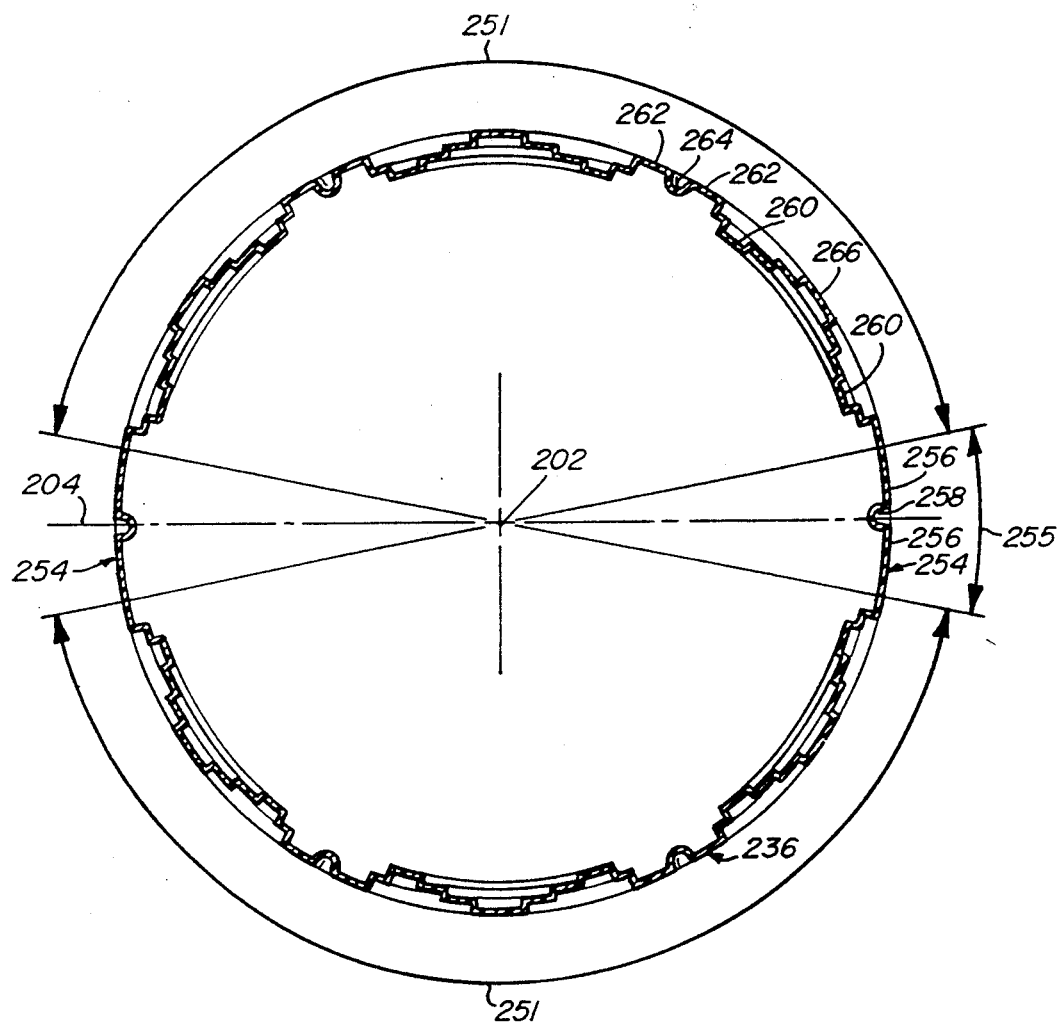
FIG. 11 is a cross sectional view of the container of FIG. 10 taken along section lines 10—10, showing the cross section of the vacuum panels and the relative angular extents of the panel (spot label) sections and connecting end segments.
Figure 12:
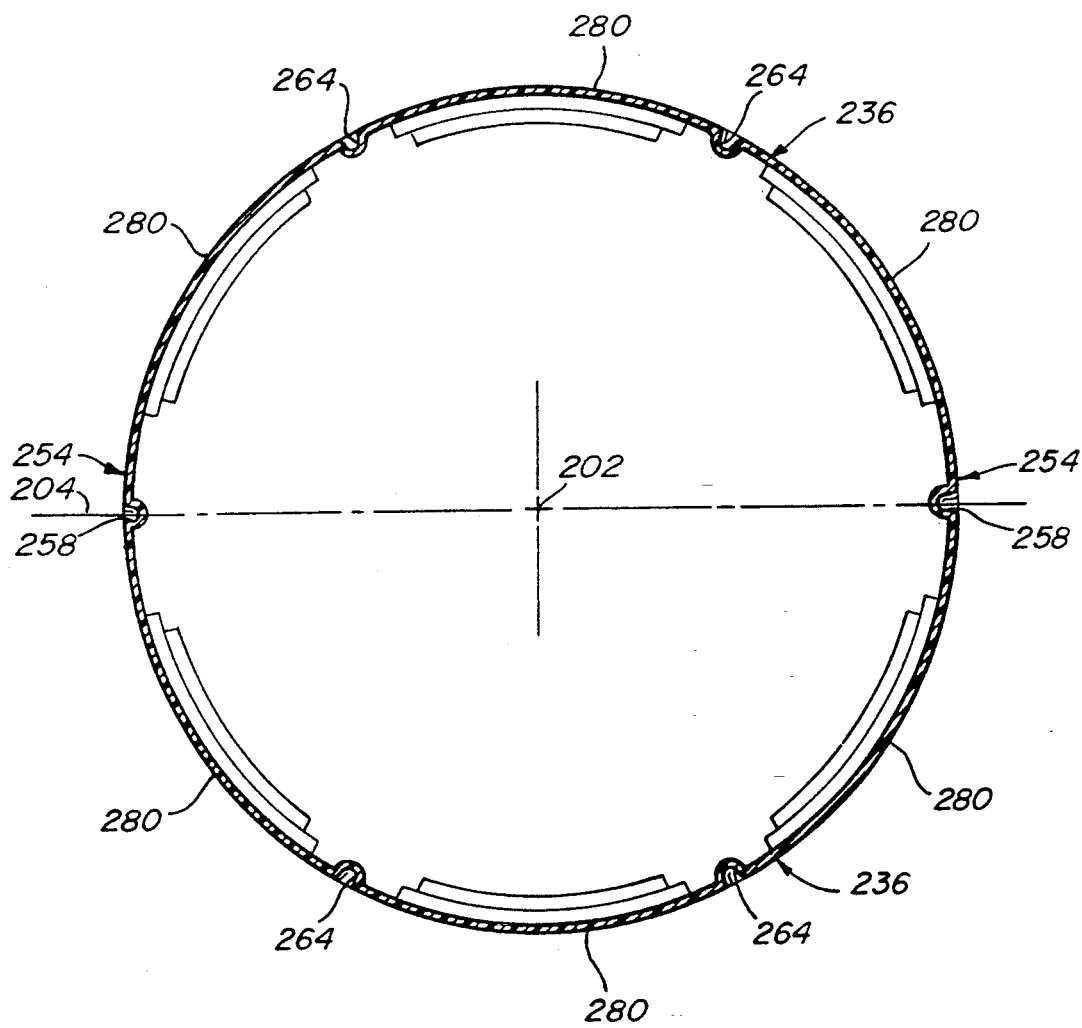
FIG. 12 is a further cross sectional view of the container of FIG. 10 taken along section lines 12—12, showing the cross section of the horizontal stiffening portion.

FIGS. 10-11 illustrate front and cross sectional views of a large panel, spot label design for a 64-ounce PET beverage bottle 230. The bottle is similar in many respects to the previously described bottle 130 and in that regard corresponding elements have been identified by adding "200" to the reference numeral. However, in this case a pair of symmetrical spot label panel sections 236, 236 are provided on opposite sides of a vertical plane 204 passing through a vertical centerline 202 of the container, which panel sections 236, 236 are joined by connecting end segments 254 to form the entire panel circumference. A rectangular spot label 250 is provided over the vacuum panels 240 in each panel section 236, which label is attached with adhesive to the top and bottom glue lands 238, 242 and side post walls 262. A vertically elongated rib 258 is provided at the midpoint of the connecting segment 254 to increase the longitudinal stiffness.

As shown in FIG. 11, the angular extent 251 of the spot label area is substantially greater than the angular extent 255 of the connecting segment, and preferably angular extent 251 ranges from about 120° to about 160° and angular extent 255 ranges from about 20° to about 60°. The angular extent 255 of the connecting segment is substantially greater than the angular extent of the post wall 262 (about 15°) in order to maximize the vacuum panel size. The post walls 262, raised walls 266 and wall portions 256 of the connecting segment 254, are the areas of greatest resistance to hoop stretchability and can be maximized in order to reduce barreling.

The hoop stretchability of bottle 230 is further reduced by providing a full-diameter horizontal stiffening rib 280 between the three symmetrical pairs of vacuum panels 240 above and below the mid-vertical cross-sectional plane (corresponding to section lines 12—12). Thus, the combined effect of ribs 280 and enlarged connecting segments 254 decreases the hoop stretchability. In may further be desired to provide horizontal stiffening ribs across the post ribs 264, in a manner similar to the previous embodiments.

Figures 13, 14:
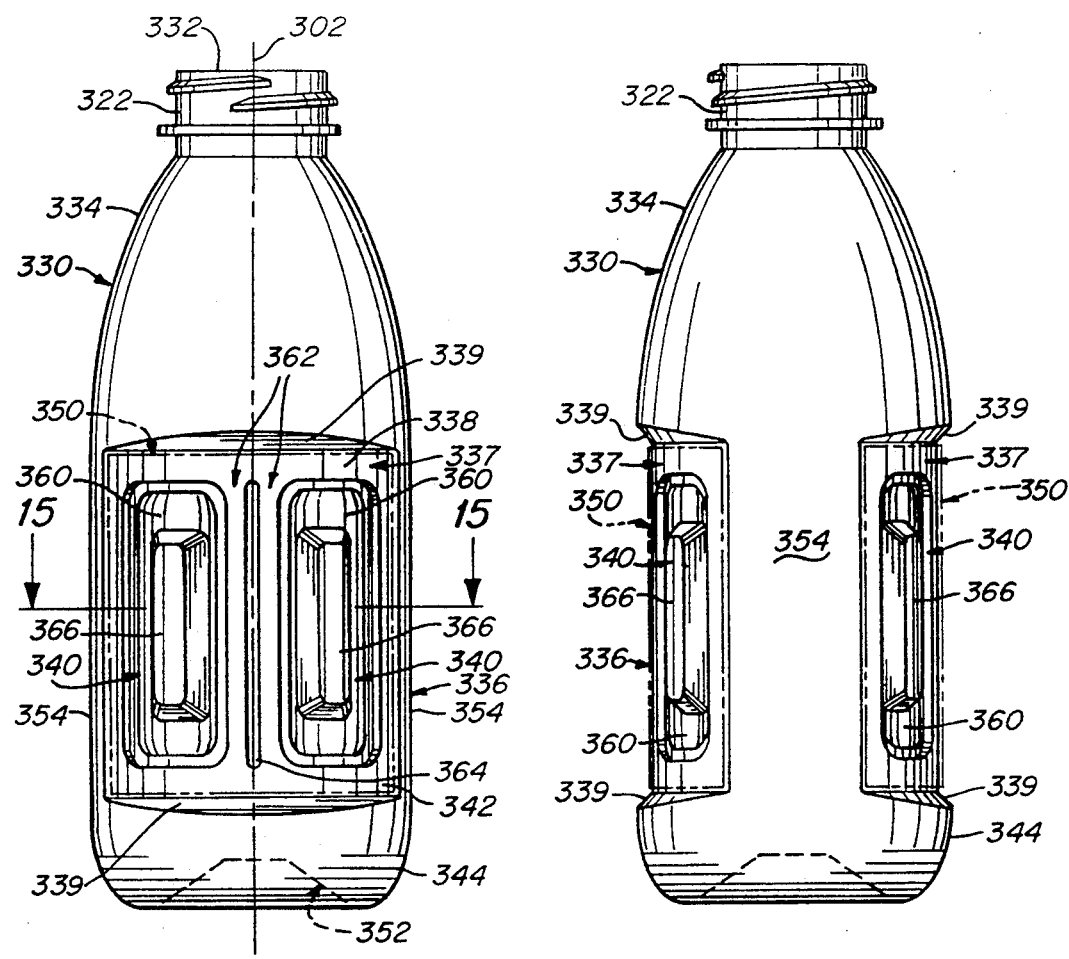
FIG. 13 is a front elevational view of a third embodiment of this invention showing a squeezable hot-fill container adapted for spot labeling, having two recessed panel sections symmetrically disposed about a vertical plane passing through a vertical centerline of the container, with connecting end segments therebetween, and with two vacuum panels in each panel section.
FIG. 14 is a side elevational view of the container of FIG. 13 showing the two connecting end segments.
Figure 15:
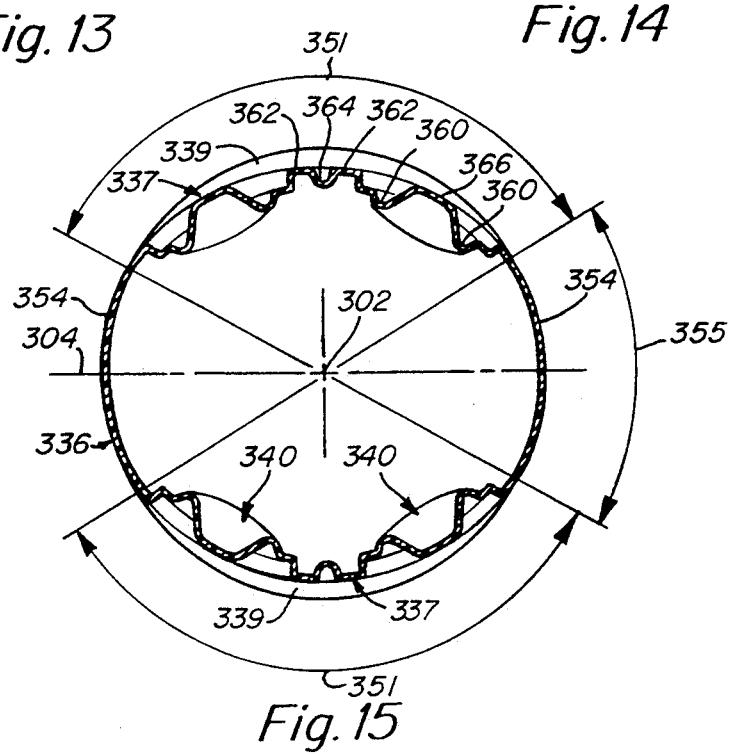
FIG. 15 is a cross sectional view of the container of FIG. 14 taken along section lines 15—15, showing the cross section of the recessed panel sections and the relative annular extents of the panel (spot label) sections and connecting end segments.

A further embodiment is shown in FIGS. 13-15, particularly adapted for making a hot-fill container which is squeezable. Such a bottle is particularly useful to bicycle riders when provided in a smaller volume (e.g., 16-32 ounce) and wherein the opposing vacuum panel areas may be squeezed between the fingers to eject the beverage out the open mouth of the container, which may further be fitted with a nozzle for this purpose (not shown).

The bottle 330 of FIGS. 13-15 is substantially cylindrical about vertical centerline 302 and includes an open mouth 332, upper thread finish 322, tapered upper shoulder portion 334, substantially vertical panel wall 336 and base 344 with a recessed closed bottom end 352. A pair of recessed panel areas 337 are symmetrically disposed on opposite sides of a vertical plane 304 which passes through the vertical centerline 302 of the bottle. Each panel section 337 is recessed from the maximum panel diameter of the two connecting end segments 354, by sloped upper and lower wall portions 339 in order to protect the spot labels 350, provided over panel section 337, during shipment and storage. A pair of vacuum panels 340, 340 is provided in each panel section 337 between post areas 362. Each vacuum panel includes recess 360 and raised wall 366 at the center of the vacuum panel, similar to that described in the prior embodiments. Post ribs 364 are provided at the midpoint of the post wall 362, similar to those of the prior embodiments.

As shown in the cross-sectional view of FIG. 15, the angular extent 351 of the spot label panel section 337 is greater than the angular extent 355 of the connecting end segments 354, but to a significantly less degree than in the embodiment of FIG. 10. In this example, the angular extent 351 of each spot label is about 120°, while the angular extent 355 of each end segment is about 60°. This may be varied to optimize the squeezability and reduce the hoop stretchability of the container as desired. To further reduce the hoop stretchability, horizontal stiffening ribs similar to those shown in the prior embodiments (180, 182, 184) may be added to the panel sections 337.

Although certain preferred embodiments of the invention have been specifically illustrated and described herein, it is to be understood that variations may be made without departing from the spirit and scope of the invention as defined by the appended claims. For example, the container sizes and shapes may be varied as well as the vacuum panel designs. Further, the containers may be other than bottles and may be made from other thermoplastic resins or other materials. Thus, all variations are to be considered as part of the invention as defined by the following claims.

What is claimed is:

1. An improved vacuum panel container comprising:
    a hollow body having a substantially cylindrical panel wall aligned along a vertical centerline and a closed bottom end;
    the panel wall including a pair of panel sections symmetrically disposed about a vertical plane passing through the vertical centerline and a pair of connecting end segments between the panel sections, each of the panel sections and connecting end segments having an angular extent which together form the complete cylindrical panel wall;
    each panel section including a post wall disposed a first distance $D_1$ from the vertical centerline;
    each panel section further including a vacuum panel having a vertically-elongated recess disposed a section distance $D_2$ from the vertical centerline which is less than the first distance $D_1$;
    wherein the post wall provides an area for attachment of a label to the container which covers the recess;
    each panel section having an angular extent of from about 120° to about 160°; and
    wherein each connecting end segment is disposed at a distance from the vertical centerline greater than the second distance $D_2$, and each connecting end segment has an angular extent of from about 20° to about 60° in order to reduce barreling of the panel wall.

2. The container of claim 1, wherein the connecting end segments further include a vertically-elongated rib to further stiffen the panel wall.

3. The container of claim 1, wherein the relative angular extents defined by the connecting end segments and panel sections about the vertical centerline provide a squeezable container.

4. The container of claim 1, wherein the panel sections further include horizontally-disposed stiffening ribs which extend across at least a portion of the recess, the stiffening ribs being disposed at a distance from the vertical centerline which is greater than the second distance $D_2$.

5. The container of claim 1, wherein the panel sections are recessed inwardly from the connecting end segments so as to be disposed at a lesser distance from the vertical centerline.

6. The container of claim 1, wherein the post wall and connecting end segments are both disposed at first distance $D_1$ from the vertical centerline.

7. The container of claim 1, wherein each vacuum panel includes a pair of recesses and a raised wall between the pair of recesses, the raised wall being disposed at a distance from the vertical centerline which is greater than the second distance $D_2$ at which the recesses are disposed, and wherein the angular extents of the post wall, raised wall and connecting end segments reduce barreling of the panel wall.

8. The container of claim 1, wherein the container is a biaxially-oriented polyethylene terephthalate beverage bottle adapted to receive a hot-fill product.

* * * * *